United States Patent [19]

Hunyar

[11] 4,211,617
[45] Jul. 8, 1980

[54] PROCESS FOR PRODUCING A STAMPER FOR VIDEODISC PURPOSES

[75] Inventor: Csaba K. Hunyar, Los Angeles, Calif.
[73] Assignee: MCA Disco-Vision, Inc., Los Angeles, Calif.
[21] Appl. No.: 944,499
[22] Filed: Sep. 21, 1978

Related U.S. Application Data

[63] Continuation of Ser. No. 552,249, Feb. 24, 1975, abandoned.

[51] Int. Cl.² .......................... C25D 1/10; C25D 1/20
[52] U.S. Cl. ............................................. 204/5; 204/6
[58] Field of Search ........................................ 204/4–6; 346/137; 427/132; 358/128; 274/46 C

[56] References Cited

U.S. PATENT DOCUMENTS

| | | | |
|---|---|---|---|
| 1,930,826 | 10/1933 | Scott | 204/6 |
| 2,075,646 | 3/1937 | Hewitt | 204/5 |
| 2,530,842 | 11/1950 | Ruggieri | 204/5 |
| 3,894,179 | 7/1975 | Jacobs | 178/6.6 R |
| 3,954,469 | 5/1976 | Avanzado | 96/35.1 |

OTHER PUBLICATIONS

*On Printing Motion*, by Kramer, et al., Reprinted from Eduology, vol. 4, Issue 1 (1973).

Primary Examiner—T. M. Tufariello
Attorney, Agent, or Firm—Ronald J. Clark

[57] ABSTRACT

A stamper for producing replicas of a video disc master formed of a glass substrate containing surface irregularities in the form of an information pattern of raised protrusions is formed by applying a strike coating of a conductive metal such as silver and then electroplating copper and nickel to form a self-supporting negative replica member, termed as "mother," which can be stripped from the surface of the master. The interior of the mother is cleaned and passivated preparatory to use as a mandrel in the electroforming of a positive replica submaster. The submaster may function as a stamper or be utilized after passivation as a mandrel in the electroforming of a submother from which a stamper or a plurality of stampers are formed.

2 Claims, 11 Drawing Figures

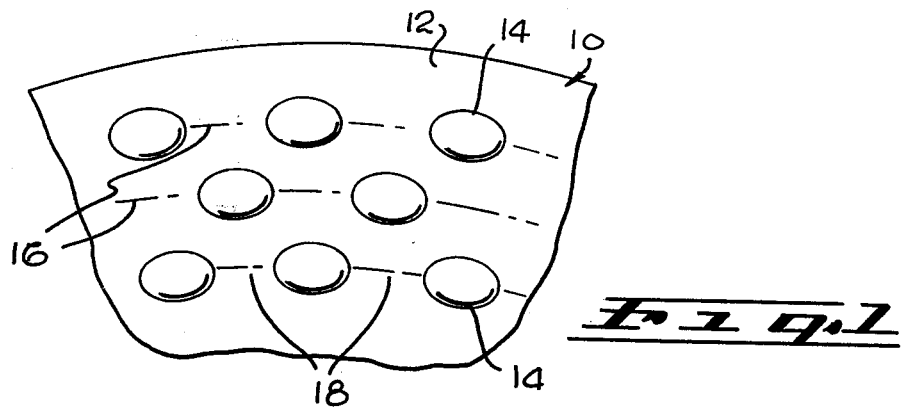
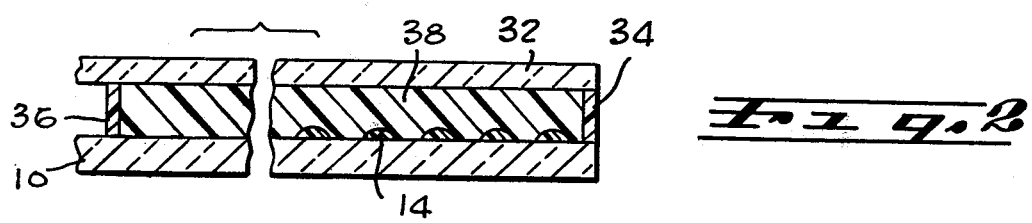
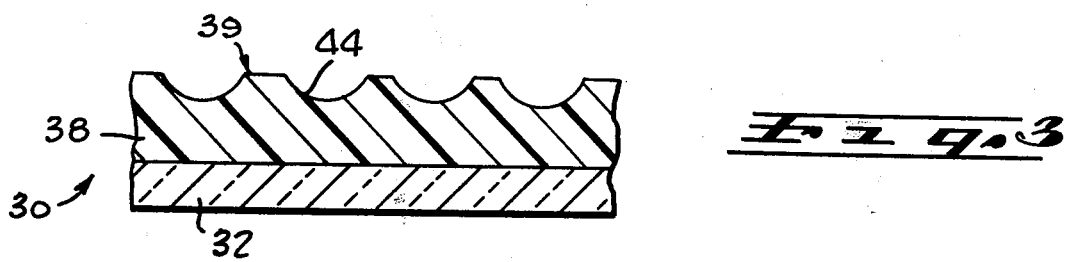
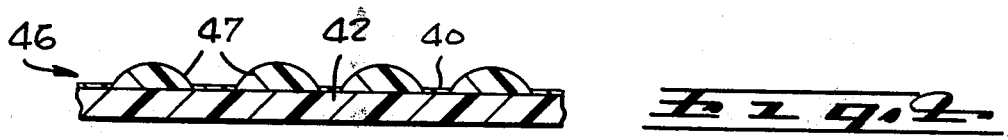
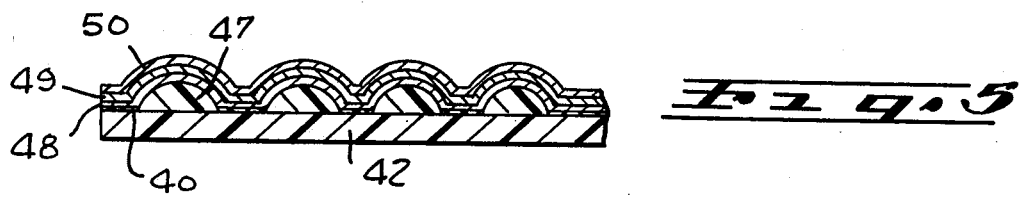

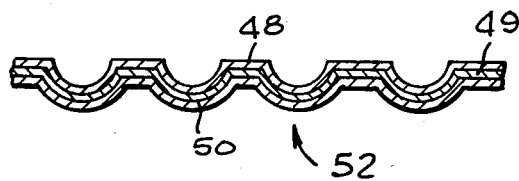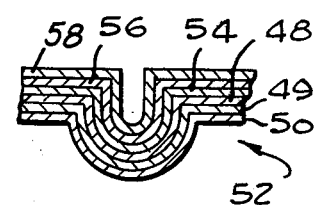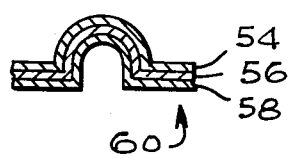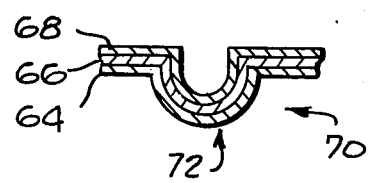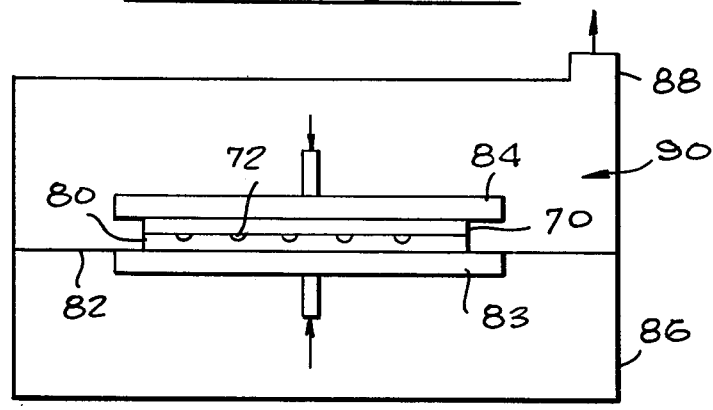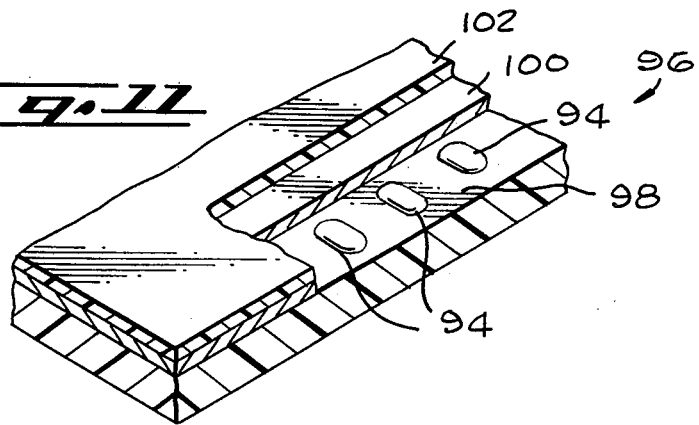

PROCESS FOR PRODUCING A STAMPER FOR VIDEODISC PURPOSES

This is a continuation of application Ser. No. 552,249, filed Feb. 24, 1975, now abandoned.

BACKGROUND OF THE INVENTION

1. Field of the Invention

The present invention relates generally to the replication of original records and, more particularly, to a method of converting a video disc master which contains information in the form of microscopic "holes" in a metal surface into a master suitable for use in producing replicas.

2. Description of the Prior Art

Over the years, there has been a continuing attempt to achieve a low-cost, mass-produced disc which contains video information that can be retrieved with an inexpensive home instrument for playback through a conventional television set. Early attempts at providing video information have generally involved the use of video tape recorders of various sorts as well as photographic techniques. Still other approaches have attempted to utilize thermoplastic recording or the surface alteration of a thin metallic film.

In the copending application of John S. Winslow, Ser. No. 333,560, filed Feb. 20, 1973, and assigned to the assignee of the present invention, a method and apparatus was shown for producing a video disc master which utilized a high power laser in conjunction with a glass disc having a thin film of a relatively low melting point material, such as bismuth, coated thereon. The laser beam was intensity modulated with the video information, and at the point of impingement upon the bismuth film surface, the laser beam, at relatively greater intensities, contained sufficient energy to melt the bismuth film.

The preferred physical properties of a low melting point material, such as bismuth, are that the surface tension of the melted material should cause the molten material to immediately coalesce into small, submicroscopic nodules, thereby leaving an area substantially free of the opaque metal coating. According to the Winslow application, typical "holes" representing video information were on the order of 1 micron.

The single master thus produced cannot, in and of itself, under prior art methods and techniques, be easily utilized to produce hundreds of thousands of replicas rapidly and at low cost. Accordingly, it has been deemed desirable to somehow modify the recorded master so that replication can be easily accomplished.

In the prior art, it has been known to create "masks" with a predetermined pattern which, in turn, could be used in connection with photoetching techniques to create a plurality of duplicate surfaces, each with a similar predetermined pattern in the surface. For example, such a mask could be utilized to selectively expose discs having a very thin metal surface coating to a laser beam, and a plurality of discs having a similar "hole" pattern in the surface could be produced.

Alternatively, a photoengraving process may be employed utilizing a master mask which, through chemical etching techniques, can result in a patterned disc.

Such techniques would not be directly applicable to the needs of the video disc system as presently envisaged because of the costs involved and the time required to create the duplicates or replicas. Since the pattern dimensions closely approximate the wavelength of visible radiation, normal, high-speed photographic duplication techniques would be seriously affected by diffraction effects.

One of the principal advantages in the use of a video disc for recording and reproduction of audio-visual material through a conventional television set over magnetic tape is the opportunity for rapid, mass production of duplicate discs. The relative ease of producing duplicate audio discs versus the methods of producing audio tapes quickly illustrates that discs can be stamped at relatively high speeds in large numbers of presses while each tape record requires the serial recordation on a length of tape of the information to be recorded.

Consequently the relative costs that must be considered as between video tape and video disc are the cost of the material itself, the cost of equipment for transferring the information and the time required for the information transfer. In the audio field, the cost factors clearly favor the disc approach and it has been determined that similar consideration would obtain when providing recorded video information.

In a prior copending application assigned to the assignee of the present invention, Gregg, supra, Ser. No. 735,007, filed Jan. 27, 1969, now abandoned and continued as Ser. No. 571,259, filed Apr. 24, 1975 apparatus was disclosed for embossing information on a sheet vinyl disc. The creation of the stamper was assumed without any detail as to how the stamper might be created. In the video disc system which has been disclosed in the several related patent applications and patents listed, supra, an original master is created through the use of a high-powered laser and a flat disc having a thin film of reasonably low melting point, high surface tension, opaque material. The resulting master, however, has information represented as transparent areas in an opaque surface with the transparent areas arranged in an interrupted generally circular path which, in a preferred embodiment, is arranged in a concentric spiral.

Since the thickness of the heat sensitive opaque layer may be as little as several hundred Angstrom units, the master thus produced cannot be directly used in the stamping, compression molding, injection molding or embossing of a duplicate or replica record. In the above-identified patent applications to Jarsen, and Avanzado, et al., methods were disclosed which resulted in the production of a substantially three-dimensional matrix, wherein the relatively opaque and clear areas are converted into surface discontinuities or bumps which can be preferably 0.7 micron in height. These bumps are of a photoresist material overlying the original master plate. It would be desirable to utilize this photoresist matrix in the creation of a stamper which can be used to emboss, mold or stamp replica discs at relatively low cost in mass production quantities.

SUMMARY OF THE INVENTION

According to the present invention, the photoresist matrix is converted into self-supporting, rigid, high resolution, negative and positive replicas capable of mass production of replicas by embossing or stamping thermoplastic discs as described in the Gregg application Ser. No. 735,007 by rendering the surface of the photoresist matrix conductive, suitably by electroless application of a thin layer of silver and then utilizing the conductive matrix as a mandrel in a process for electroforming a negative replica "mother" of substantial thickness and strength. The bismuth layer on the glass disc may be removed before application of the conductive layer.

The mother in turn may be utilized to form a series of positive replica submothers by pretreating the silver surface so as to release an electrodeposited layer and then utilizing the treated surface as a mandrel for electroforming the submothers. The pretreatment is suitably a passivation treatment such as by oxidation or sulfurization to form a thin surface silver oxide or silver sulfide which prevents the formation of a strongly adherent bond with the thick metal deposit.

A plurality of submasters may be electroformed from the mother and utilized as a stamper or embossing member, or the submasters after passivation may be utilized as mandrels for forming a next generation of submothers which in turn can be utilized to form a series of stampers.

The stamper produces replicas by stamping or embossing a thermoplastic material such as vinyl. The stamper and a sheet of vinyl are supported on platens in a chamber. The chamber is depressurized to remove air from between the sheet and the stamper. The sheet is heated to softening temperature and pressure applied to emboss the protrusion pattern into the surface of the sheet. The assembly is cooled and separated to provide an embossed disc. In a preferred embodiment, the embossed disc is "read" through the plastic, so that the depressions produced by the positive stamper appear to the playback equipment as bumps. The replica can then be provided with a reflective metal layer such as by a vapor deposition process. If desired, an outer wear layer of clear plastic can be applied to the reflective layer.

The same stamper is also used for compression and injection molding of replicas. In this process the stamper (2 stampers if replication is done on both sides of the record) are attached to a suitable molding die which has internal heating and cooling channels.

In the compression molding process these channels are heated and cooled alternately by the application of steam and cooling water. The pre-heated and pre-softened plastic material, like vinyl, PVC or the like is then placed within the pressing die equipped with a stamper or 2 stampers and the die is subjected to a high pressing force, for instance in a hydraulic press. The squeezed and formed video disc is then cooled by the application of cooling water in the die channels while under pressure. The press is opened and the finished product is removed. The excess material is then trimmed from the video record.

Injection molding uses a similar process, except the channels in the die are kept at a constant temperature with a circulating luke warm cooling media like water. After the closure of the die, the pre-melted, plastic-like vinyl, polystyrene, acetal resins, or the like are injected in a fluid stage into the mold cavity. The plastic hardens immediately, and after a few seconds curing time, the mold is opened and the finished video disc is removed. In the injection molding process none or very little excess flash is produced, so trimming is usually unecessary.

In an alternate replication process, the photoresist matrix is first replicated by casting or molding a negative replica of the matrix surface by means of a releasable, curable resin. The negative replicated mother surface of the mold so produced is then rendered conductive and utilized as a mandrel in the electroforming process for producing a submaster according to the invention. A suitable casting process is disclosed in copending application of Manfred H. Jarsen Ser. No. 406,686, filed Oct. 15, 1973 the disclosure of which is incorporated herein by reference.

In the video disc systems described in the related patents and applications, one systems approach permits the use of either a thin, flexible disc, or a heavier, rigid disc, both of which can be produced from stampers made by the present method. Such discs can be read on appropriate playback equipment as has been heretofore disclosed.

It is obvious that the present method could be modified to produce replicas in which the surface deformations are depressions rather than elevated portions, should that type of replica better lend itself to the playback equipment. Further, the requirements of the playback equipment would also determine the size and shape of the surface deformations which represent the video information.

For example, in one system being developed by the assignee, a reading technique is employed which utilizes light scattering and light reflection to generate electrical signals of different significance. In such a system, the "bumps" or "depressions" serve to scatter rather than reflect light applied from the player device. The surface between adjacent bumps or depressions, however, serves as a plane reflector, and returns substantially all of the light to the player optical system.

In alternative schemes, phase contrast optics are employed in which case it is desirable that reflecting planes spaced apart by $n\lambda/4$ (where $\lambda$ is the wavelength of the playback radiation and "n" is an odd integer) are employed so that light is reflected from the plane surfaces but light from the surface discontinuity destructively interferes with the light from the plane surface and therefore provides a distinctive signal to the reading optics.

Given an original matrix having such characteristics, the present process is admirably suited to produce replicas utilizing the stamper of the present invention that is created from the matrix.

The novel features which are believed to be characteristic of the invention, both as to organization and method of operation, together with further objects and advantages thereof, will be better understood from the following description considered in connection with the accompanying drawings in which several of the preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view of a portion of a matrix member for replication in accordance with the invention;

FIG. 2 is a cross-sectional view of an assembly for forming a first negative elastomeric mold replication of the matrix of FIG. 1;

FIG. 3 is a side sectional view of the elastomeric mold;

FIG. 4 is a side sectional view of a cast replication of the mold of FIG. 3;

FIG. 5 is a side sectional view of a metal replication of the cast replication of FIG. 4;

FIG. 6 is a sectional view of the completed mother member;

FIG. 7 is a sectional view of a metal replication submaster of the mother member;

FIG. 8 is a sectional view of the separated submaster;

FIG. 9 is a sectional view of a portion of a stamper member;

FIG. 10 is a schematic view of a stamping apparatus; and

FIG. 11 is a perspective view partly in section of a finished replica disc.

DESCRIPTION OF THE PREFERRED EMBODIMENTS

Referring now to FIG. 1, the matrix member 10 to be replicated according to the present invention is shown. The matrix member 10 has an upper, smooth planar surface 12 on which are mounted a plurality of rounded protuberances 14 generally arranged in a concentric spiral track 16. Although the individual protuberances are arranged in a generally circular pattern, the track 16 is a discontinuous one and includes a flat surface area 18 between adjacent protuberances 14. The preferred embodiment of the present invention contemplates an information track 16 arranged in a spiral, but alternative embodiments contemplating information arranged in circular tracks (not shown) as well. It is to be further noted that while the preferred embodiment illustrated in FIG. 1 shows each track 16 to include protuberances 14, it is equally feasible to supply depressions in place of the protuberances 14. The surface features provided in the playback replica are intended to scatter radiation rather than reflect it; the choice of one or the other is dictated primarily by the considerations of producing the final stamper or embosser or a casting or molding replica in negative or positive form with respect to the original matrix member 10.

Referring now to FIG. 2, in the preferred embodiment of the replication process, the matrix to be replicated is prepared as disclosed in the copending Manfred H. Jarsen application, (Ser. No. 402,636 filed Oct. 1, 1973) the disclosure of which is incorporated herein by reference. As taught in that application, the matrix 10 includes a polished, glass disc 22 on which the video information is arranged as a series of non-conductive photoresist protuberances 14 approximately 0.7 microns high and generally 1 micron in the radial direction. The bumps are generally arranged in a concentric spiral track with a spacing of approximately 2 microns between the centers of adjacent tracks.

The matrix 10 may or may not have remaining on the surface a very thin layer of low melting point, opaque material such as a thin film of bismuth. The bismuth film has perforations below each protuberance 14. If desirable, the bismuth may be removed utilizing a suitable chemical solvent or etchant before metalizing the matrix.

The matrix 10 may be utilized as the forming member for the first replication by metal plating. The matrix 10 may alternatively be first replicated utilizing curable resins to form a two-step positive replica thereof having the protuberances of an insulative material provided on a planar substrate. Referring now to FIGS. 2 and 3, an elastomeric mold negative replica of the matrix member 10 is produced by coating the surface of the matrix with a mold release agent such as polyvinyl alcohol and coating the opposing surface of a flat, rigid substrate 32 such as glass with a primer and then forming a laminate assembly with the surfaces separated by end spacers 34 and central spacer 36. A curable liquid elastomer material such as a silicone rubber elastomer is mixed with catalyst, filtered and degassed and then poured over the surface of the matrix 10. The glass plate 32 with the primed surface down is placed on the spacers 34 and 36. Pressure and heat are applied to effect cure to form a molding member 38 typically 14 mils thick having elastomeric negative replica mold surface 39 which readily separates from the matrix 10 after cure.

In the next stage of the process for forming an alternative matrix in accordance with the invention, a cast positive replica of the mold surface 39 is formed by casting a curable organic liquid resin such as a polyurethane, acrylic or an epoxy into the mold and polymerizing the resin by heat, radiation or catalyst. The layer of resin 40 is suitably supported on a substrate such as a sheet 42 of Mylar polyester film. The cast layer is generally 3–7 microns thick, suitably about 5 microns. After the liquid resin is poured into the mold, pressure is applied to the substrate sheet 42 suitably from a roller member to minimize occurrence of trapped bubbles and to assure that the resin fills the depressions 44 completely. The cast positive replica 46 as shown in FIG. 4 includes a flat substrate 42 on which is supported a pattern of a multiplicity of raised insulator protuberances 47. This replica 46 can also function as the matrix 10 in the plating replication process of the invention to be now further described. Further details of the molding/casting replication steps are disclosed in copending Jarsen application Ser. No. 406,686, the disclosure of which is incorporated herein by reference.

Referring now to FIG. 5, the first step in the metal plating replication process of the invention is the metalizing of the surface of the matrix member to render it conductive. The term "matrix" will be understood to include either the master with the developed photoresist pattern or a replica which may have been made from such a master. The metal layer is suitably applied by vapor bombardment, vapor deposition or deposition from electroless plating solution. Suitably the surface is silverplated with an electroless process similar to that used for producing mirror surfaces. The initial silver film 48 is deposited only to a thickness sufficient to support electroconductivity, suitably from about 0.01 to about 2 mils, so that the next electroplating step can be undertaken.

The silverplated matrix member is now in condition to act as a mandrel for the electroforming of the first negative replica mother member 52 of FIG. 6. The mother 52 is formed by connecting the silver layer 48 as the cathode in an electroplating bath in which is dissolved a salt of the metal to be plated, suitably copper or nickel so that a sufficiently thick and hard, self-supporting structural member is formed. In a particular embodiment of the invention the silver layer 48 is first connected as the cathode in a copper electroplating bath and copper 49 to a thickness of 2–10 mils, suitably about 6 mils, is plated onto the silver layer to provide a copper layer 49 having substantial mass which provides support for the silver surface. The copper plated member is then immersed in a nickel-plating bath and a layer of nickel 50 having a thickness from 1–10 mils, suitably about 5 mils, is electroplated over the copper layer 49 for even greater strength and support.

The nickel/copper/silver composite member is then stripped from the master matrix to form the mother disc 52 shown in FIG. 6. Any of the cured photoresist resin or casting resin which may have adhered to the silver surface 48 is cleaned away. The glass polished surface of the master disc 10 (if a master 10 is the matrix) can then be cleaned, polished and then recoated with bismuth for use as a new master according to the process disclosed and claimed in previous applications. The mother member 52 may also serve as the mold member 30 as described above for forming cast replicas suitable for use in the process disclosed in previous application Ser. No. 406,686 or for forming a cast replica suitable for acting as a matrix in the process of the invention.

The negative replica mother 52 may be further replicated utilizing it as a mandrel in a further electroforming process to create a submaster. Generally the silver surface 48 is pretreated to render it more readily separable from the following replication. The surface is suitably passivated by oxidation such as by oxygen gas, ozone or a weak liquid oxidizing agent such as nitric acid or potassium permanganate. Referring now to FIG. 7, the mother member 52 is connected as a cathode in a nickel-plating bath and a layer 54 of nickel is electroplated onto the passivated silver surface 48. The nickel layer 54 is suitably 2–10 mils thick, generally about 5 mils, and a further layer of copper 56 and an additional layer of nickel 58 may be similarly electroplated onto the previous layers to provide a self-supporting positive replica submaster member 60 as shown in FIG. 8. The process may be repeated using the submaster 60 as a mandrel to produce a submother.

A plurality of stamper members 70 as shown in FIG. 9 are similarly produced by utilizing either the submaster 60 or the submother member as a mandrel in the electroforming process to form a composite member having a plurality of layers 64, 66, 68 suitably formed respectively of nickel, copper, and nickel on either a "positive" or "negative" of the original matrix. The stamper member 70 is stripped from the passivated surface of the submother mother member.

The finished stamper includes a positive replica 72 of the protrusions 14 of the matrix member 10. This positive replica is a hardened surface suitably for acting as a forming member for replication of numerous copies from thermoplastic members such as vinyl resins, for example, polyvinylchloride through molding, stamping or embossing processes.

Referring now to FIG. 10, a sheet or disc 80 of vinyl is placed between a metal disphragm 82 which is backed by a first platen member 83 and the forming surface of the stamper 70 supported on a second platen member 84. The assembly is placed within an enclosure 86 which is depressurized through vent 88 to remove air from between the disc of thermoplastic 80 and the stamper 70. The assembly 90 is heated to the softening temperature of the thermoplastic disc 80 while pressure is applied to the diaphragm 82 and the platens 83, 84. The softened thermoplastic resin is embossed by the protrusion of the positive replica to form depressions.

The preferred replica disc 96 produced is shown in FIG. 11. This disc is read through the plastic, so that the depression produced by the positive stamper 70 appear to the reading apparatus as bumps. The preferred replica disc 96 could alternatively be produced by use of a sub-mother as the stamper. The sub-mother, having indentations, would produce a pattern or protruding bumps on the replica disc produced, which disc would be read from the convex side of the bumps.

The final replica disc 96 includes, in a preferred embodiment, a surface pattern of discontinuous bumps 94 separated by planar surface areas 98. A reflective metal coating 100, such as aluminum, is applied by a process such as vapor deposition to enhance the reflectivity of the planar portions 98 and to enhance the light scattering capability of the individual surface deformations 94 representing information.

If desired, an additional clear plastic coating 102 can be applied to the disc 96 to protect the metallic surface 100 from scratches, abrasion and wear. Further, such a layer would keep scratches, fingerprints and the like out of the plane of focus of the reading beam which acquires the information represented by the bumps 94.

Thus, there has been disclosed a complete process for converting the information pattern of a matrix containing an information pattern in the form of relatively fragile protuberances from a planar surface relatively fragile into a strong, self-supporting stamper for forming replica discs by a stamping embossing process. The invention also includes a process for forming mold or casting members also suitable for use in mass production of plastic replicas of the matrix member utilizing molding or casting processes.

It is to be understood that only preferred embodiments of the invention have been described and that numerous substitutions, alterations and modifications may be made without departing from the spirit and scope of the invention as defined in the following claims.

What is claimed is:

1. A process for producing a video disc member from which a plurality of replica video discs can be formed, and for producing a video disc member for use as an intermediate product from which additional stamper and die members can be formed, said process comprising the steps of:

providing a body having an upper surface carrying indicia of the video information to be produced, and said upper surface being substantially flat for establishing a substantially planar surface in the resulting replica member suitable for reflecting light incident thereupon, and said upper surface having discontinuities out of the plane of the surface for scattering light incident thereupon, and each of said discontinuities being separated by a flat portion of said upper surface, and said discontinuities and flat surface portions being arranged in a video information track, each discontinuity having a constant dimension in the radial direction and a constant maximum dimension in the direction perpendicular to said surface, the length of each discontinuity in the circumferential direction and the distance between adjacent discontinuities in the circumferential direction representing the video information to be reproduced;

forming a silver layer upon said upper surface and said discontinuities to a thickness sufficient to support electroconductivity in a subsequent electroplating bath and said thickness lying within the range of 0.01 mil to 2 mils;

electroplating a copper layer upon said exposed surface of said silver layer to a thickness sufficient for forming a self supporting member having a thickness lying within the range of 2 mils to 10 mils;

electroplating a nickel layer upon said copper layer for greater strength and support and having a thickness lying within the range of 1 mil to 10 mils; and separating said combined first, second and third layers from said body for providing a first video disc member having a silver interface surface carrying said video information in a form complementary to the form of said video information carried by said upper surface of said body and suitable for use in reproducing replica video discs having video information in a form identical to the form carried by said body.

2. A process as recited in claim 1, and further comprising the steps of:

passivating said silver layer after separation from said body for providing a readily separable interface;

electroplating a further nickel layer upon said silver layer to a thickness lying within the range of 2 mils to 10 mils;

electroplating a further copper layer upon said last mentioned nickel layer electroplating an additional nickel layer upon said last mentioned copper layer to a thickness to provide a self-supporting member; and separating said further nickel layer from said silver layer at said passivated interface for producing a third video disc member having a nickel surface layer carrying video information in a form identical to the form of said video information carried by said upper surface of said body and suitable for use in reproducing replica video discs having video information in a form complementary to the form carried by said body.

* * * * *